(12) United States Patent
Lazzeroni et al.

(10) Patent No.: US 7,014,257 B2
(45) Date of Patent: Mar. 21, 2006

(54) MOTOR VEHICLE FRONT UNIT ASSEMBLY INCLUDING MEANS FOR ADJUSTING THE POSITIONS OF THE LIGHT UNITS, AN ADJUSTMENT TOOL FOR THIS PURPOSE, AND A METHOD OF ASSEMBLING SUCH A FRONT UNIT

(75) Inventors: Eric Lazzeroni, Welzhein (DE); Didier Bierjon, Audincourt (FR)

(73) Assignee: Faurecia Bloc Avant, Nanterre (FR)

( * ) Notice: Subject to any disclaimer, the term of this patent is extended or adjusted under 35 U.S.C. 154(b) by 0 days.

(21) Appl. No.: 10/896,979

(22) Filed: Jul. 23, 2004

(65) Prior Publication Data

US 2005/0023864 A1 Feb. 3, 2005

(30) Foreign Application Priority Data

Jul. 30, 2003 (FR) .................................... 03 09404

(51) Int. Cl.
*B60J 7/00* (2006.01)
(52) U.S. Cl. ............................ 296/203.02; 296/193.09; 362/549
(58) Field of Classification Search .......... 296/203.02, 296/193.09, 203.01
See application file for complete search history.

(56) References Cited

U.S. PATENT DOCUMENTS

| | | | | |
|---|---|---|---|---|
| 4,188,655 A * | 2/1980 | Tallon et al. ................ | 362/549 |
| 4,196,459 A * | 4/1980 | Dick ........................... | 362/549 |
| 4,471,413 A * | 9/1984 | Dick ........................... | 362/528 |
| 4,602,319 A * | 7/1986 | Moriyama et al. ........... | 362/527 |
| 4,679,125 A * | 7/1987 | Dick ........................... | 362/549 |
| 4,947,306 A * | 8/1990 | O'Shaughnessey .......... | 362/528 |
| 6,190,030 B1 * | 2/2001 | Chase ......................... | 362/549 |
| 6,331,068 B1 * | 12/2001 | Chase ......................... | 362/549 |
| 6,357,821 B1 * | 3/2002 | Maj et al. .............. | 296/203.02 |
| 6,471,386 B1 * | 10/2002 | Oh ............................. | 362/549 |
| 6,523,886 B1 * | 2/2003 | Hoffner et al. ........ | 296/203.02 |
| 6,729,008 B1 * | 5/2004 | Nishijima .............. | 296/203.02 |
| 6,729,681 B1 * | 5/2004 | Yustick .................. | 296/203.02 |
| 6,895,647 B1 * | 5/2005 | Matsumoto et al. ....... | 29/281.4 |
| 6,923,495 B1 * | 8/2005 | Kishikawa et al. .... | 296/203.02 |
| 2001/0046140 A1 * | 11/2001 | Chase et al. ................ | 362/549 |

(Continued)

FOREIGN PATENT DOCUMENTS

EP       1 232 932       8/2002

(Continued)

OTHER PUBLICATIONS

Patent Abstracts of Japan, vol. 2003, No. 05, May 12, 2003 & JP 2003 011848 (Nissan Motor Co Ltd), Jan. 15, 2003.

*Primary Examiner*—Kiran B. Patel
(74) *Attorney, Agent, or Firm*—Young & Thompson

(57) ABSTRACT

The assembly includes a front face, a bumper skin, two flexible brackets, and two light units, each of which is rigidly secured to a corresponding bracket. The assembly further includes pre-positioning and guide elements adapted to provide pre-positioning that allows a first end of each of the brackets to move in a substantially axial direction relative to the front face, the elements including members for driving the first end in axial translation relative to the front face, the members operating by meshing, and elements for releasably receiving an adjustment tool in a meshing position. An adjustment tool, and a method of assembling and mounting such a front unit assembly are also disclosed.

5 Claims, 5 Drawing Sheets

U.S. PATENT DOCUMENTS

| | | |
|---|---|---|
| 2002/0117875 A1 | 8/2002 | Hoffner et al. |
| 2005/0088015 A1 * | 4/2005 | Kishikawa et al. .... 296/193.09 |
| 2005/0134092 A1 * | 6/2005 | Lazzeroni .............. 296/203.01 |

FOREIGN PATENT DOCUMENTS

| | | |
|---|---|---|
| FR | 2 708 554 | 2/1995 |

* cited by examiner

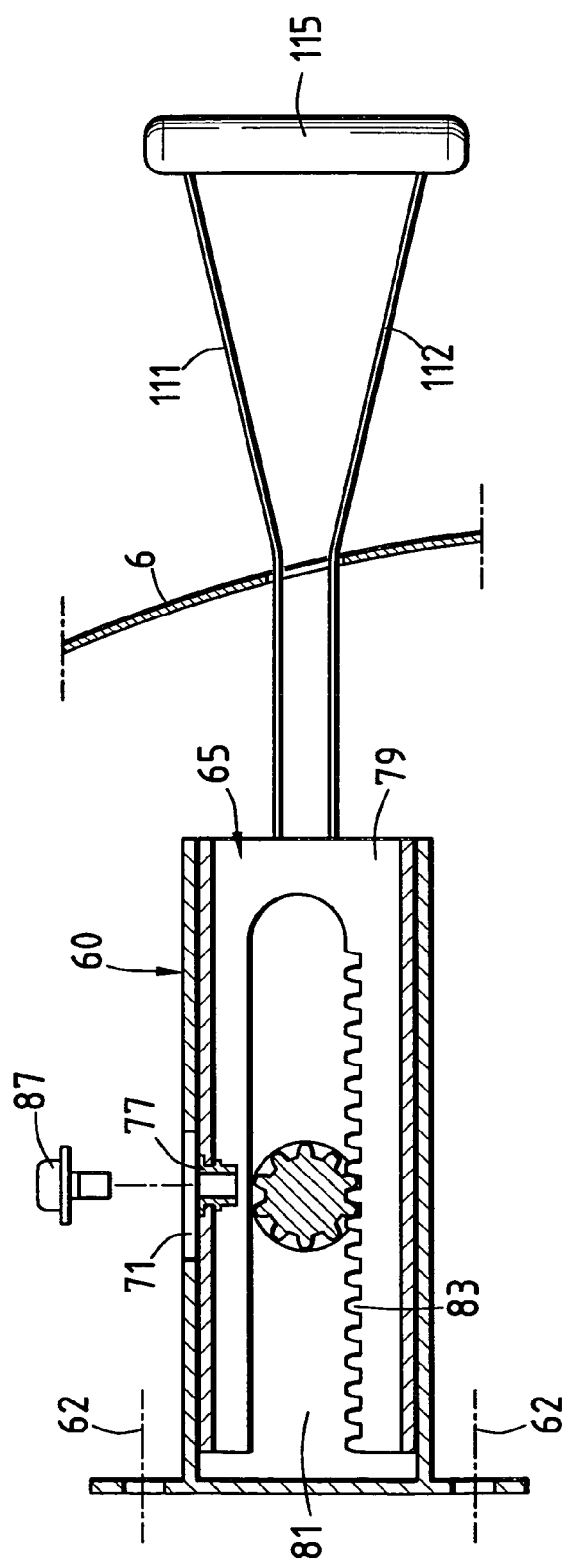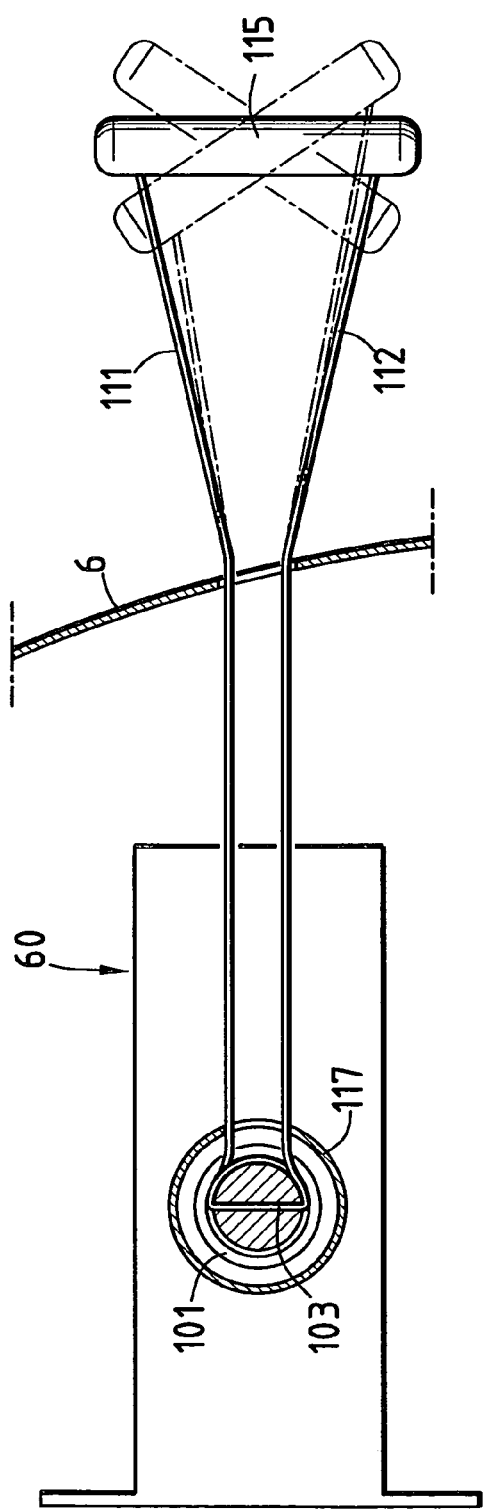

MOTOR VEHICLE FRONT UNIT ASSEMBLY INCLUDING MEANS FOR ADJUSTING THE POSITIONS OF THE LIGHT UNITS, AN ADJUSTMENT TOOL FOR THIS PURPOSE, AND A METHOD OF ASSEMBLING SUCH A FRONT UNIT

The present invention relates to a motor vehicle front unit assembly comprising a front face, which presents a central portion and two side portions, a bumper skin, two flexible brackets extending laterally and forming supports for the bumper skin, each having a first end connected to the central portion and a second end for connection to the front portion of a corresponding vehicle bodywork fender, and two light units, each rigidly secured to a respective one of the brackets.

BACKGROUND OF THE INVENTION

Such an assembly is described in document EP-A-1 232 932, for example.

The structure described in that document enables the visible outlines of the light units to be positioned automatically and permanently relative to the ends of the corresponding fenders and to the bumper skin. Simultaneously, that structure ensures accurate relative positioning of the ends of the fenders and of the bumper skin.

In order to improve the appearance of the vehicle, it can also be desirable to ensure continuity of appearance for the light units and the bumper skin with other bodywork elements, such as the hood of the vehicle.

OBJECTS AND SUMMARY OF THE INVENTION

An object of the invention is to provide a front unit in the form of a pre-assembled module, whose appearance elements, constituted by the light units and the bumper skin, can easily be adjusted and locked in position, after the module has been mounted on the bodywork of the vehicle in order to ensure continuity of appearance with bodywork elements such as the hood.

To this end, a front unit assembly of the invention further comprises pre-positioning and guide means connecting the first end of each bracket to the central portion, which means are adapted to provide pre-positioning that enables said first end to be moved in a substantially axial direction relative to the front face, and means for locking said first end in position relative to the front face;

said pre-positioning and guide means comprising drive means for driving the first end axially in translation relative to the front face, said means operating by meshing, and means for releasably receiving an adjustment tool in a position where it meshes with said drive means;

whereby, when the first end is pre-positioned but not locked in position, actuating the adjustment tool causes the first end to move axially relative to the front face, thereby adjusting the position of the light unit and of the bumper skin relative to the hood.

According to other characteristics of the front unit assembly of the invention:

said pre-positioning and guide means comprise a tubular sleeve secured to the front face, and a coaxial complementary finger secured to the bracket beside its first end, and suitable for sliding (axially in said sleeve;

said locking means comprise a member for rigidly securing the finger in the sleeve, e.g. a screw-and-nut assembly, one of the finger and the sleeve being formed with an axially-extending oblong opening for engagably receiving said fastener member in a plurality of relative axial positions of the sleeve and the finger;

said drive means comprise an axial rack secured to the finger and suitable for co-operating with a complementary pinion secured to the adjustment tool; and the tool receiving-means comprise openings formed facing each other in the sleeve so as to constitute bearings for rotatably supporting the tool on an axis of rotation extending transversely relative to the common axis of the sleeve and the finger.

The invention also provides a tool for adjusting the position of a light unit and a bumper skin in a front unit assembly as described above, the tool the tool comprising a shaft suitable for being removably engaged to rotate in the tool-receiving means, a pinion that is complementary to the rack and that is designed to co-operate therewith when the shaft is engaged in the tool-receiving means, and deformable means for actuating the shaft in rotation and adapted to enable a user placed at a distance from the shaft to turn the shaft.

According to optional characteristics of the tool of the invention:

said deformable means for actuating the tool comprise two sections of traction cable connected to the shaft in such a manner that traction exerted on one of the two sections causes the shaft to turn in one direction, and traction exerted on the other section causes the shaft to turn in the opposite direction; and said actuator means include a drive handle interconnecting the two cable sections at a distance from the shaft.

Finally, the invention provides a method of assembling a front unit assembly as described above, and of mounting such a front unit assembly on motor vehicle bodywork, in which the following steps are performed in succession:

mounting each optical unit on the corresponding bracket;

pre-positioning each bracket at its first end relative to the front face, and fixing the bumper skin to the resulting assembly;

mounting the resulting front unit assembly on the vehicle bodywork and fixing each bracket via its second end to the corresponding front fender portion;

engaging an adjustment tool, as described above, in the tool-receiving means;

closing the hood;

driving the tool so as to move the first end relative to the front face, thereby adjusting the position of the light unit and of the bumper skin relative to the hood;

opening the hood;

locking the position of the first end of each bracket relative to the front face; and disengaging the adjustment tool from the tool-receiving means.

BRIEF DESCRIPTION OF THE DRAWINGS

An embodiment of the invention is described below in greater detail with reference to the accompanying drawings, in which:

FIGS. 4 and 5 are section views on vertical axial planes respectively on lines 4—4 and 5—5 in FIG. 3, showing a portion of a vehicle hood together with the elements of FIG. 3 in an adjustment situation.

MORE DETAILED DESCRIPTION

Figure 1:
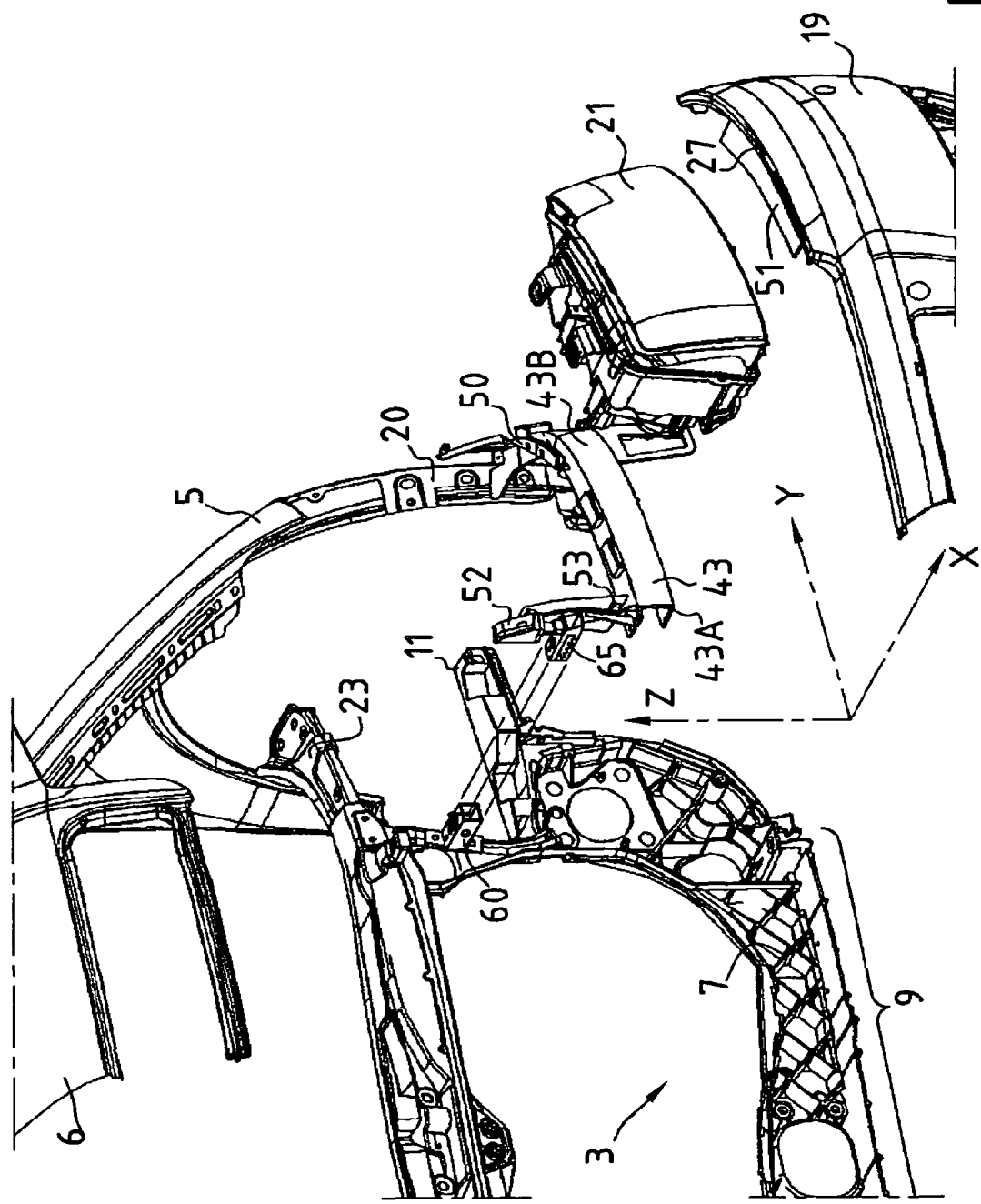
FIGS. 1 and 2 are exploded front perspective views seen looking along different directions and showing a portion of a front unit assembly of the invention, a corresponding front portion of a bodywork fender, and a portion of a hood.
Figure 2:
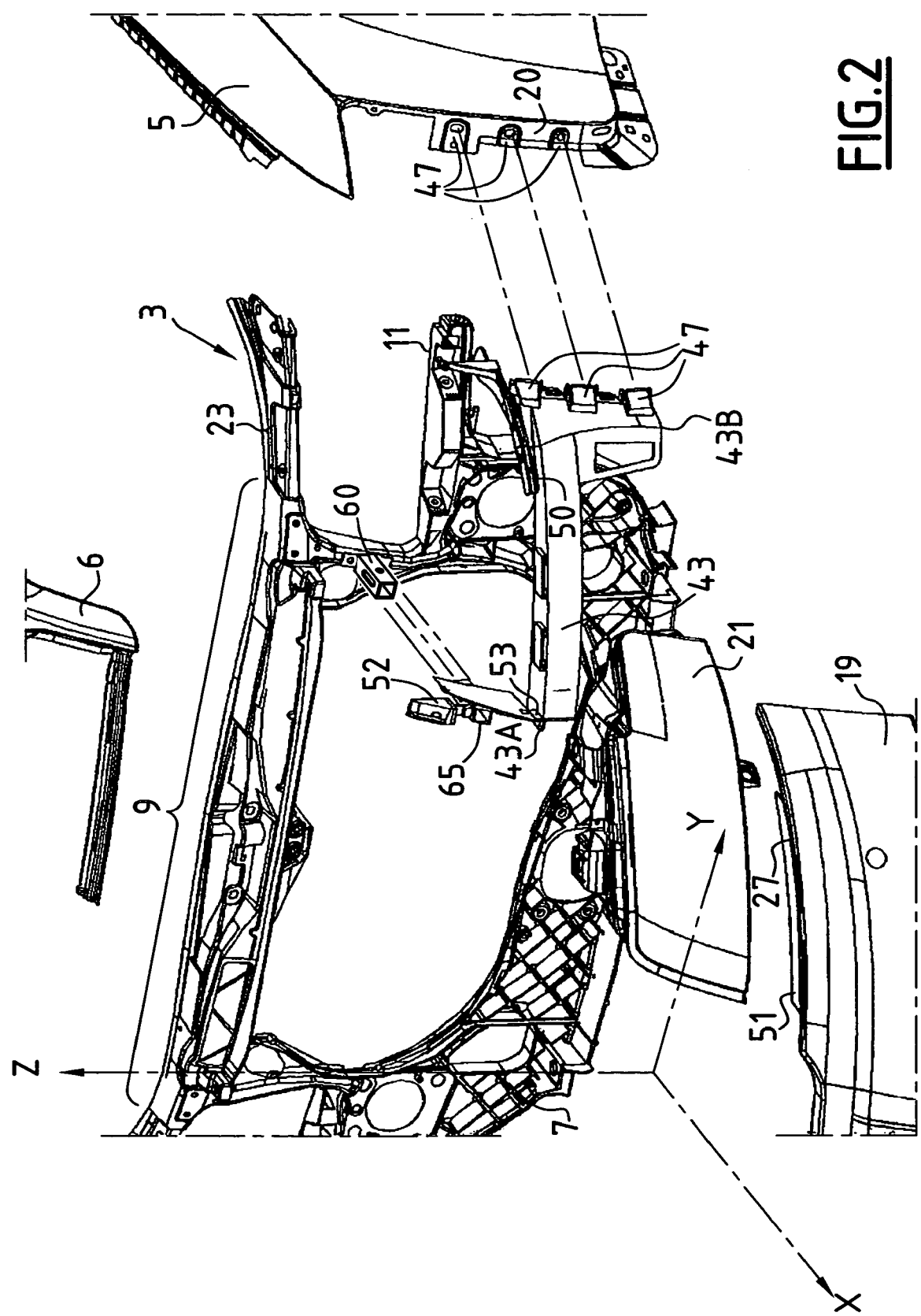

In FIGS. 1 and 2, there is shown a front portion of a motor vehicle comprising a front unit assembly 3 (shown in part), a front end 5 of a bodywork fender, and a front end 6 of a hood.

Figure 3:
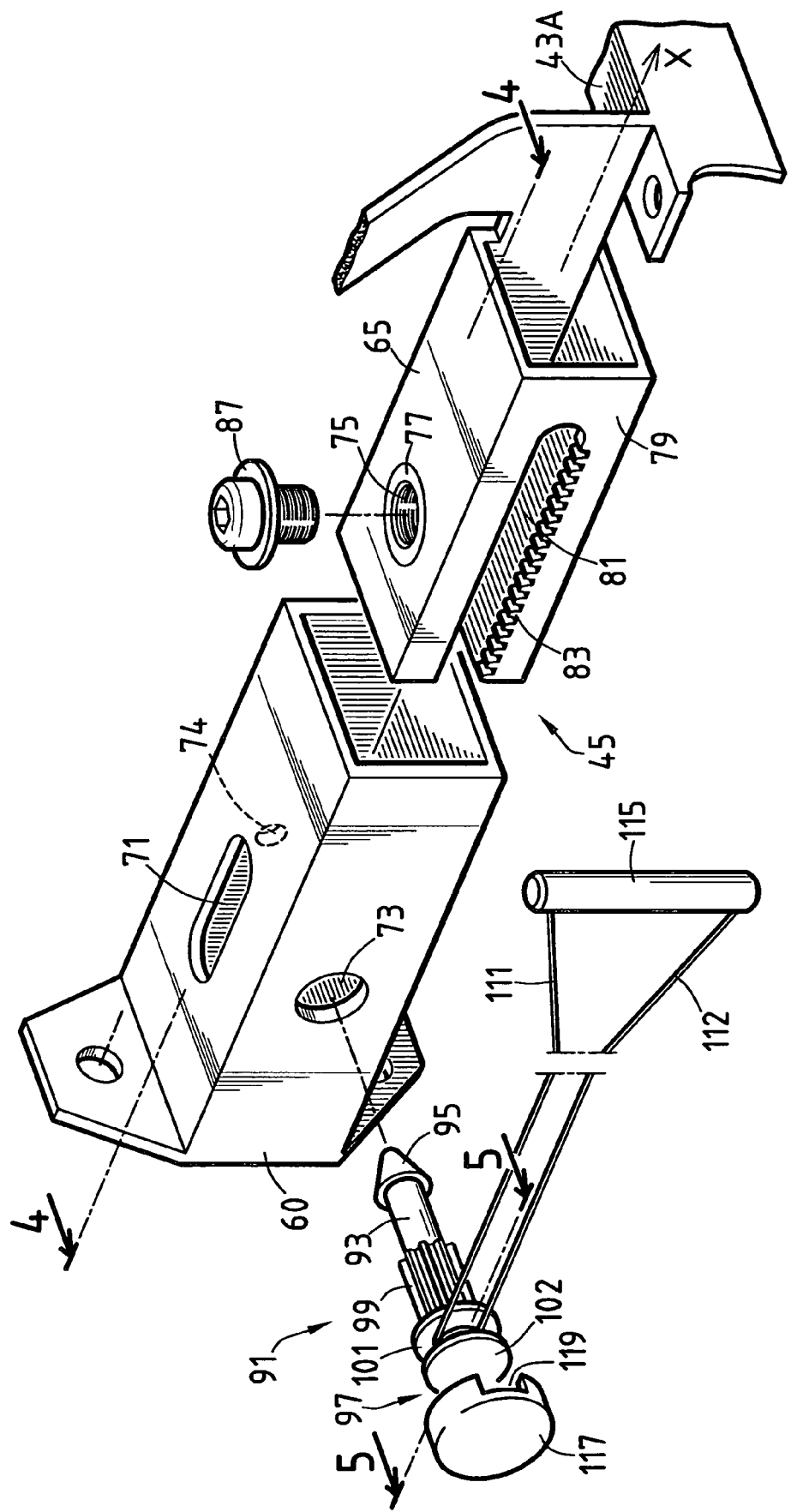
FIG. 3 is a diagrammatic perspective view of pre-positioning and guide means for the front unit assembly shown in the FIGS. 1 and 2, together with an adjustment tool in accordance with the invention.

These FIGS. 1 and 2, and also following FIGS. 3 and 4 are oriented relative to three axes X, Y, and Z which corresponds to the usual orientation of the vehicle, namely, respectively: the longitudinal axis X oriented in the forward direction; the transverse axis Y oriented from right to left, as seen by the driver; and the vertical axis Z oriented upwards. All of the terms used in the description below relating to direction or positioning should be understood with reference to this system of axes.

The vehicle front portion shown in FIGS. 1 and 2 is symmetrical or almost symmetrical about a vertical midplane of the vehicle. For greater clarity, these figures and the following description relate only to the portion situated on the left-hand side of the vehicle.

The front unit assembly 3 of the vehicle, or "front unit" for short, comprises an essentially rigid structure constituted by a front face 7, which presents a central portion 9 and a side portion 11.

The front unit 3 further comprises a bumper skin 19, e.g. made of a piece of plastics material and placed across the entire width of the front face 7, extending laterally beyond the side portions 11 of the front face, and pressed against an edge of the fender front end 5, coinciding therewith. On each side, the front unit 3 further comprises a light unit 21 mounted on the front face in complementary shapes, beneath a top edge 23 thereof, and above a top edge 27 of the bumper skin 19.

Furthermore, on either side, the front unit 3 includes a rounded bracket 43 extending essentially sideways along the direction of the bumper skin 19. This rounded bracket 43 has a first end 43A connected to the central portion 9 of the front face via complementary pre-positioning and locking means which are described in detail below, and a second end 43B rigidly secured to the edge 20 of the fender front portion by complementary fastener means 47.

The bracket 43 is flexible insofar as, when the second end 43B is secured to the edge 20, the first end 43A can be moved by elastically deforming the bracket 43, and insofar as the bracket 43 can deform without significantly deforming the fender portion. In addition, the bending stiffness of the front face 7 is much greater than that of the bracket 43.

A transversely extending gutter 50 is formed on the top portion of the bracket 43, extending generally in the same direction as the bracket 43. This gutter 50 receives a flap 51 formed to project from the top edge 27 of the bumper skin 19 so as to fasten the bumper skin 19 to the bracket 43, while making allowance for relative adjustment movements along the general direction of the bracket 43.

The bracket 43 is adapted to support the corresponding light unit 21. For this purpose, the bracket 43 is provided with two vertical plane bearing faces 52, 53 facing towards the second end 43B, i.e. the outer end, of the bracket 43, and designed to co-operate with corresponding outwardly-directed projections on the light unit 21 so that the light unit is positioned accurately relative to the bracket 43 in the Y direction. The light unit 21 is rigidly secured to the bracket 43 by locking means (not shown) such as screw-and-nut pairs.

Reference is made to FIGS. 3 and 4 while describing in greater detail the pre-positioning and guide means.

In FIG. 3, it can be seen that the shape of the portion of the bracket 43 that presents the vertical bearing face 52 is shown in considerably simplified form in order to clarify the figure.

These means 45 comprise a hollow sleeve 60 of rectangular section, rigidly secured by fastener means 62 to the central portion 9 of the front face, so as to project forwards therefrom along a longitudinal axis that is oriented substantially along the longitudinal axis X of the vehicle. In reality, the axis of the sleeve may possibly be offset angularly relative to the X axis.

The pre-positioning and guide means 45 further comprise a finger 65 that projects towards the rear of the end 43A of the bracket, the outside shape of the finger 65 being complementary to the inside surface of the sleeve 60 so as to be suitable for being engaged coaxially therein. The finger 65 is also in the form of a tubular sleeve of rectangular section.

In FIG. 3, the sleeve 60 and the finger 65 are shown in a position waiting to be mutually engaged, whereas in FIG. 4, they are shown in mutual engagement in a situation for adjusting their relative position.

The sleeve 60 is formed with a first through oblong hole 71 arranged in its top wall, said hole 71 being elongate in the direction X of the axis of the sleeve 60.

Two circular openings 73 and 74 are formed in the side walls of the sleeve 60 facing each other on the same axis which extends orthogonally to the direction X. One of these openings 73 is greater in diameter than the other 74.

In its top wall, the finger 65 is provided with a circular hole 75 whose center coincides with the longitudinal axis of the oblong hole 71 when the finger 65 is engaged in the sleeve 60, the circular hole 75 being of a diameter that is substantially equal to the width of the oblong hole 71. The inside of the finger 65 is also secured (e.g. welded) to a nut 77 that opens out into the hole 75.

Furthermore, a notch 81 is formed in one of the side walls 79 of the finger 65, and the inside edge of the notch presents a set of teeth forming an axial rack 83. The rack 83 is designed to be assigned to a pinion engaged through the opening 73 from outside the sleeve 60, in a manner that is described below.

The nut 77 is designed to receive a complementary screw 87 suitable for passing through the oblong hole and bearing via its head against the top wall of the sleeve 60 when tightened into the nut 77, so as to secure the finger 65 in the sleeve 60.

The fastener constituted by the nut 77 and the screw 87 thus defines means for locking the first end 43A of the bracket in position relative to the front face 7.

FIGS. 3 and 4 also show a tool 91 specially adapted for axially displacing the finger 65 in the sleeve 60 along relatively short adjustment strokes, in order to adjust the position of the first end 43A of the bracket relative to the front face 78, thereby adjusting the positions of the light unit 21 and of the bumper skin 19 relative to the hood 6.

This unit essentially comprises a shaft 93 provided at one end with a conical tip 95 and at its other end with a drive head 97.

In an intermediate portion, beside the drive head 97, the tool 91 is formed with a pinion 99 having teeth complementary to the teeth of the rack 83, as shown in FIG. 4. The outside diameter of the pinion 99 is smaller than the diameter of the opening 73.

As can be seen in FIGS. 3 and 5, the drive head 97 presents two disks 101 and 102 of the same diameter, greater than the outside diameter of the pinion 99 and of the opening 73, said disks lying on a common axis. Between the disks 101 and 102, there is provided a groove 103 formed diametrically in the section of the shaft where it extends between the two disks 101 and 102.

The tool 91 also comprises deformable means for turning the shaft 93, said deformable means being in the form of two sections of cable 111 and 112 each secured at one end to the drive head 97 and at the other end to an elongate drive handle 115. In the example shown, the two sections of cable 111 and 112 form portions of a single cable whose intermediate portion is wound around the shaft between the disks 101 and 102, and of section that is engaged in the groove 103, the two free ends of the cable being connected to two respective ends of the handle 115.

A cap 117 provided with a peripheral notch 119 is designed to engage axially on the two disks 101 and 102 so as to confine the section of cable that is associated with the shaft 93. The sections 111 and 112 project outwards from the drive head through the notch 119.

In FIG. 3, the cap 117 is shown separated from the remainder of the tool so as to reveal the section of cable connected to the shaft.

From the above, it will be understood that an operator can actuate the tool 91 remotely from the shaft 93, and thus remotely from the sleeve 60 and the finger 65. The tool 91 is more particularly designed to be used from a zone outside the vehicle that is being assembled, in front of the vehicle, with the hood 6 closed. Thus, the operator can actuate the tool 91 by action on the handle 115, while visually observing the effect produced on the relative positions of the light unit, the bumper skin, and the hood.

The tool 91 operates in a manner that is described below.

Starting from the position shown in FIG. 3, the finger 65 can be engaged in the sleeve 60, the screw 87 not being mounted in the nut 77. The operator can then engage the tool 91 through the opening 73 until the conical tip 95 engages in the opening 74. The openings 73 and 74 then define bearings rotatably supporting the shaft 93 in the sleeve 60, the opening 74 co-operating with the conical tip 95 of the tool also to define an axial abutment defining the extent to which the tool can be engaged in the sleeve 60. The pinion 99 then passes right through the opening 73 and engages with the rack 83, forming a connection via meshing teeth. In this position, the disk 101 bears against the corresponding side face of the sleeve, around the opening 73.

In order to move the finger 65 axially within the sleeve 60, the operator needs to tension the sections of cable 111 and 112 by pulling on the handle 115, and then needs to tilt the handle away from the substantially vertical position shown in FIG. 5. In so doing, the top end or the bottom end of the handle is moved towards the operator, as shown in chain-doted lines in FIG. 5.

It will be understood that tilting the handle in the vertical plane causes the shaft 23 to turn in one direction or the other, thereby causing the finger 65 to move axially in corresponding manner in one direction or the other inside the sleeve 60.

The stepdown effect of the connection between the pinion 99 and the rack 83 makes it possible to obtain axial displacement of relatively small amplitude while tilting the handle through relatively large amplitudes, thus making it possible to achieve adjustments that are extremely fine.

After the adjustment stage, the operator can lock the finger 65 relative to the sleeve 60 by tightening the screw 87 in the nut 77 so as to conserve the adjustment.

Thereafter, the operator can withdraw the tool 91 from the tool-receiving openings 73 and 74.

Figure 6:
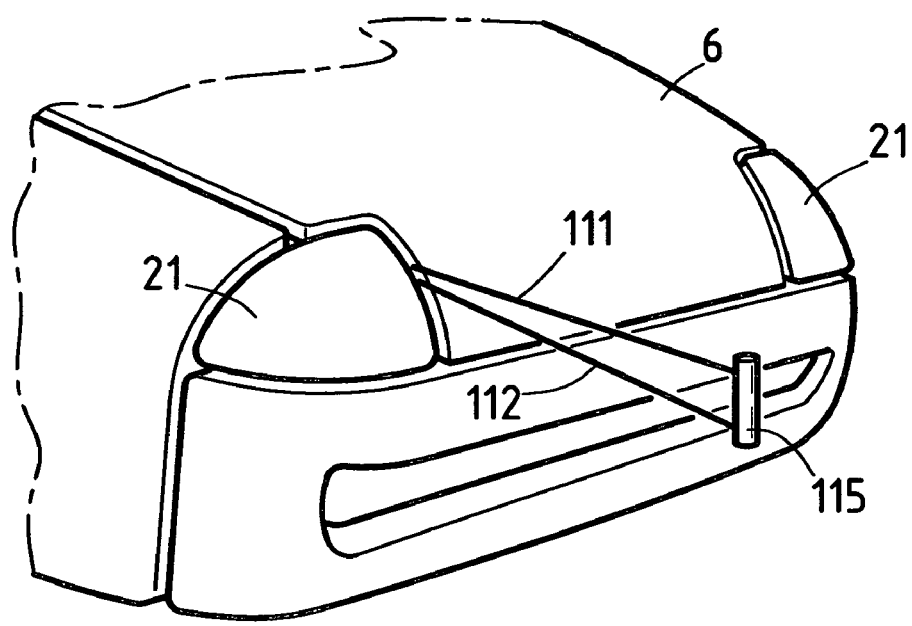
FIGS. 6 and 7 are views showing how the adjustment tool in accordance with the invention is used in the context of an assembly method of the invention, respectively for two different models of vehicle.
Figure 7:
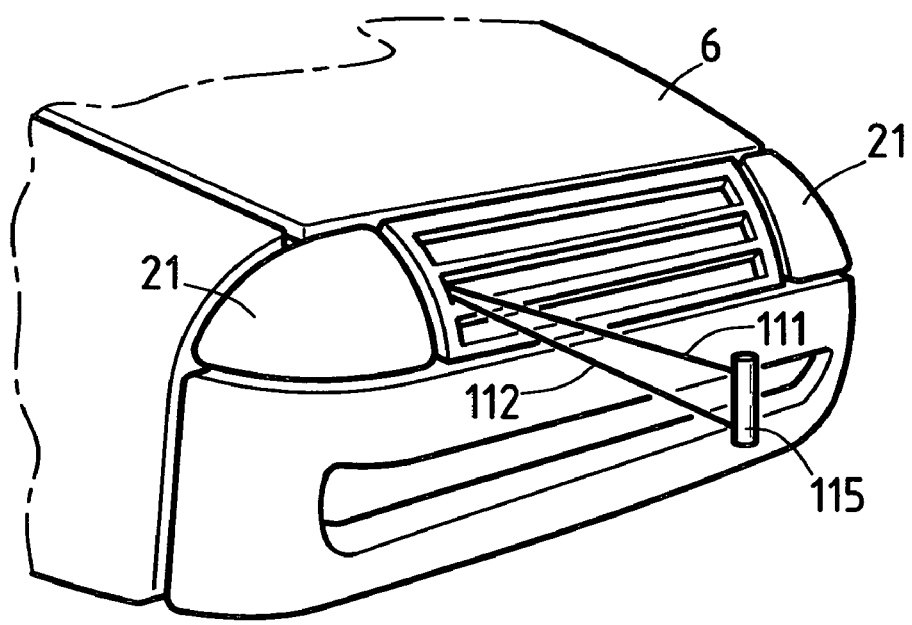

FIGS. 6 and 7 are diagrams showing how an operator can perform the adjustment operations using the tool 91 with the hood 6 closed, the operator actuating the tool 91 from a zone situated in front of the vehicle that is being assembled, the sections of cable 111 and 112 can be tensioned through various passages that are selected as a function of the model of vehicle.

For example (FIG. 6), the sections of cable 111 and 112 can be tensioned through a gap that exists between the hood 6 and the light unit 21.

In another example (FIG. 7), the sections of cable 111 and 112 can pass through the grille.

The main operations of assembling the front unit having the above-described structure are described below as are the main operations of assembling said front unit on the bodywork of the vehicle, and the operations that enable the position of the end 43A of the bracket to be adjusted relative to the front face 7, and also enable the position of the light unit 21 to be adjusted relative to the visible portions of the hood.

In a first step of the method of assembling the front unit, each light unit 21 is pre-positioned on its bracket 43. The screws for fastening the light unit 21 on the bracket 43 are put into place but they are not tightened. Initial external centering of the light unit relative to the bracket 43 is performed by pressing a rib formed on the glass of the light unit 21. Thereafter, the light unit 21 is centered or positioned on the inside by pressing projections from the glass of the light unit against the bearing surfaces 52 and 53.

The resulting light assembly constituted by a light unit 21 assembled on its bracket 43 is then placed on an assembly jig on which the front face has already been positioned via reference points corresponding to points for positioning on the bodywork. On the assembly jig, each optical assembly is put into place by positioning the second end 43B of the bracket 43 in the shape representing the theoretical position of the fender, and by positioning the first end 43A of the bracket 43 in the shape representing the theoretical position of the hood.

The assembly is then clamped.

Thereafter, the sleeve 60 is rigidly secured to the front face 7.

Thereafter, each light unit 21 is rigidly secured to the corresponding bracket 43 by means of screw-and-nut pairs.

The module built up in this way comprising the front face and the light assemblies is placed on an "assembly balancele" where the bumper skin 19 is put into place by being screwed onto the front face 9 and clipped into the gutters 50 of the brackets 43.

The module as obtained in this way can be packaged and transported to a vehicle assembly line.

In a following operation, the previously-obtained module is presented to the vehicle bodywork with the help of a handler. The handler is put into reference with the fender backing members and on the isostatic points of the front face. The light units 21, the bumper skin 19, and the bracket 43 then take up their appropriate relative positions along the Y and Z axes.

The assembly is fixed to the fender rim, in particular via the second ends 43B of the brackets on the front edges of the fender 20.

Thereafter, the front face is secured to the plates of the side rails and the fender backing members.

After withdrawing the handler, the operator puts the tool 91 into place in the tool-receiving means constituted by the openings 73 and 74 of the sleeve 60, the hood 6 then being open, as mentioned above.

The operator passes the sections of cable 111 and 112 to the outside of the vehicle, as shown in FIGS. 6 and 7.

The operator then closes the hood 6 and operates the handle 115, after putting the cable sections 111 and 112 under tension. As explained above, this enables the operator to move the first end 43A relative to the front face 7, thereby achieving the desired adjustment for the position of the light unit 21 and the bumper skin 19 relative to the hood 6.

Once this adjustment has been performed and observed visually from outside the vehicle, the operator opens the hood 6 and locks the adjustment by putting the screw 87 into place in the nut 77 and tightening it.

Once the finger 65 has been locked in the sleeve 60, the operator withdraws the tool 91 from the sleeve 60.

What is claimed is:

1. A motor vehicle front unit assembly comprising a front face, which presents a central portion and two side portions, a bumper skin, two flexible brackets extending laterally and forming supports for the bumper skin, each having a first end connected to the central portion and a second end for connection to the front portion of a corresponding vehicle bodywork fender, and two light units, each rigidly secured to a respective one of the brackets, the assembly further comprising pre-positioning and guide means connecting the first end of each bracket to the central portion, which means are adapted to provide pre-positioning that enables said first end to be moved in a substantially axial direction relative to the front face, and means for locking said first end in position relative to the front face;

said pre-positioning and guide means comprising drive means for driving the first end axially in translation relative to the front face, said means operating by meshing, and means for releasably receiving an adjustment tool in a position where it meshes with said drive means;

whereby, when the first end is pre-positioned but not locked in position, actuating the adjustment tool causes the first end to move axially relative to the front face, thereby adjusting the position of the light unit and of the bumper skin relative to the hood.

2. A front unit assembly according to claim 1, wherein said prepositioning and guide means comprise a tubular sleeve secured to the front face, and a coaxial complementary finger secured to the bracket beside its first end, and suitable for sliding axially in said sleeve.

3. A front unit assembly according to claim 2, wherein said locking means comprise a member for rigidly securing the finger in the sleeve, e.g. a screw-and-nut assembly, one of the finger and the sleeve being formed with an axially-extending oblong opening for engagably receiving said fastener member in a plurality of relative axial positions of the sleeve and the finger.

4. A front unit assembly according to claim 2, wherein said drive means comprise an axial rack secured to the finger and suitable for cooperating with a complementary pinion secured to the adjustment tool.

5. A front unit assembly according to claim 4, wherein the tool receiving means comprise openings formed facing each other in the sleeve so as to constitute bearings for rotatably supporting the tool on an axis of rotation extending transversely relative to the common axis of the sleeve and the finger.

\* \* \* \* \*